US007155009B1

United States Patent
Baker

(12) United States Patent
(10) Patent No.: US 7,155,009 B1
(45) Date of Patent: Dec. 26, 2006

(54) MODEM WITH REMOVABLE DSL CARTRIDGE

(75) Inventor: Jess Baker, Stockbridge, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 651 days.

(21) Appl. No.: 10/178,727

(22) Filed: Jun. 25, 2002

(51) Int. Cl.
*H04M 1/00* (2006.01)

(52) U.S. Cl. .................... 379/428.04; 379/428.01; 361/600; 375/222

(58) Field of Classification Search ........... 379/428.01, 379/428.04, 433.09; 307/119; 439/344, 439/638; 375/222; 361/600
See application file for complete search history.

(56) References Cited

U.S. PATENT DOCUMENTS 5,877,565 A * 3/1999 Hollenbach et al. ........ 439/344
6,174,205 B1 * 1/2001 Madsen et al. ............. 439/638
6,347,142 B1 * 2/2002 Bernardet .............. 379/433.09
6,868,117 B1 * 3/2005 Mardinian .................. 375/222
2003/0007320 A1 * 1/2003 Yan et al. ................... 361/600

* cited by examiner

*Primary Examiner*—Bing Q. Bui
(74) *Attorney, Agent, or Firm*—Withers & Keys, LLC

(57) ABSTRACT

A modem including a removable DSL filter cartridge is disclosed. The modem includes a location adapted to receive a filter cartridge. The filter cartridge is designed to fit inside the location provided on the modem. The filter cartridge includes a first end that electrically connects the filter cartridge to the modem and a second end that faces outwards. The second end includes a telephone connector or port so that users can plug telephones directly into the port. The filter cartridge includes a DSL filter to help eliminate unwanted noise on the telephone line and the filter cartridge is designed to be easily removable.

13 Claims, 4 Drawing Sheets

MODEM WITH REMOVABLE DSL CARTRIDGE

BACKGROUND

1. Field of the Invention

The present invention relates generally to modems, and more particularly, to a DSL modem.

2. Background of the Invention

DSL (Digital Subscriber Line) service provides customers with high speed access to the Internet and other computer networks. Customers who request DSL service often contact a DSL service provider who then either dispatches a technician to the customer's dwelling to install the equipment necessary to support DSL service, or sends a self-install kit to the customer with instructions that include the necessary installation procedures.

Regardless of exactly how the DSL service installation is performed, one required step of the DSL installation is to provide a filter for every modem and/or telephone in the dwelling. A filter is required to block unwanted noise generated by DSL signals from interfering with conventional voice telephones.

Generally, local telephone companies provide four wires for each dwelling. Two wires or leads are used for conventional POTS (Plain Old Telephone Service), leaving two remaining wires. It has been observed that most customers place a conventional telephone near the point where DSL service is provided. For example, if DSL service is accessed from a computer placed in a home office, many customers will also have a conventional telephone in the home office as well, and often the conventional telephone will be placed near the computer that is used to access DSL services.

In those instances where a telephone is placed near the access point for DSL services, a splitter is required to split the conventional telephone wires from the DSL wires. The splitter is normally mounted on the wall where the DSL line enters the dwelling. The splitter is used to split the line and thus provide a DSL connection and a telephone connection.

SUMMARY OF THE INVENTION

The present invention is directed to a modem that provides DSL service and also provides a connection for a telephone. The modem includes a removable DSL filter cartridge. The modem includes a location or place that is designed to receive a filter cartridge. The filter cartridge is designed to fit inside the location provided on the modem. The filter cartridge includes a first end that electrically connects the filter cartridge to the modem and a second end that faces outwards. The second end includes at least one telephone connection or port so that users can plug telephones or other suitable devices directly into the port. The filter cartridge includes a DSL filter to help eliminate unwanted noise on the telephone line. The filter cartridge assembly is designed to be easily removable.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

DETAILED DESCRIPTION OF THE PREFERRED EMBODIMENTS

Figure 1:
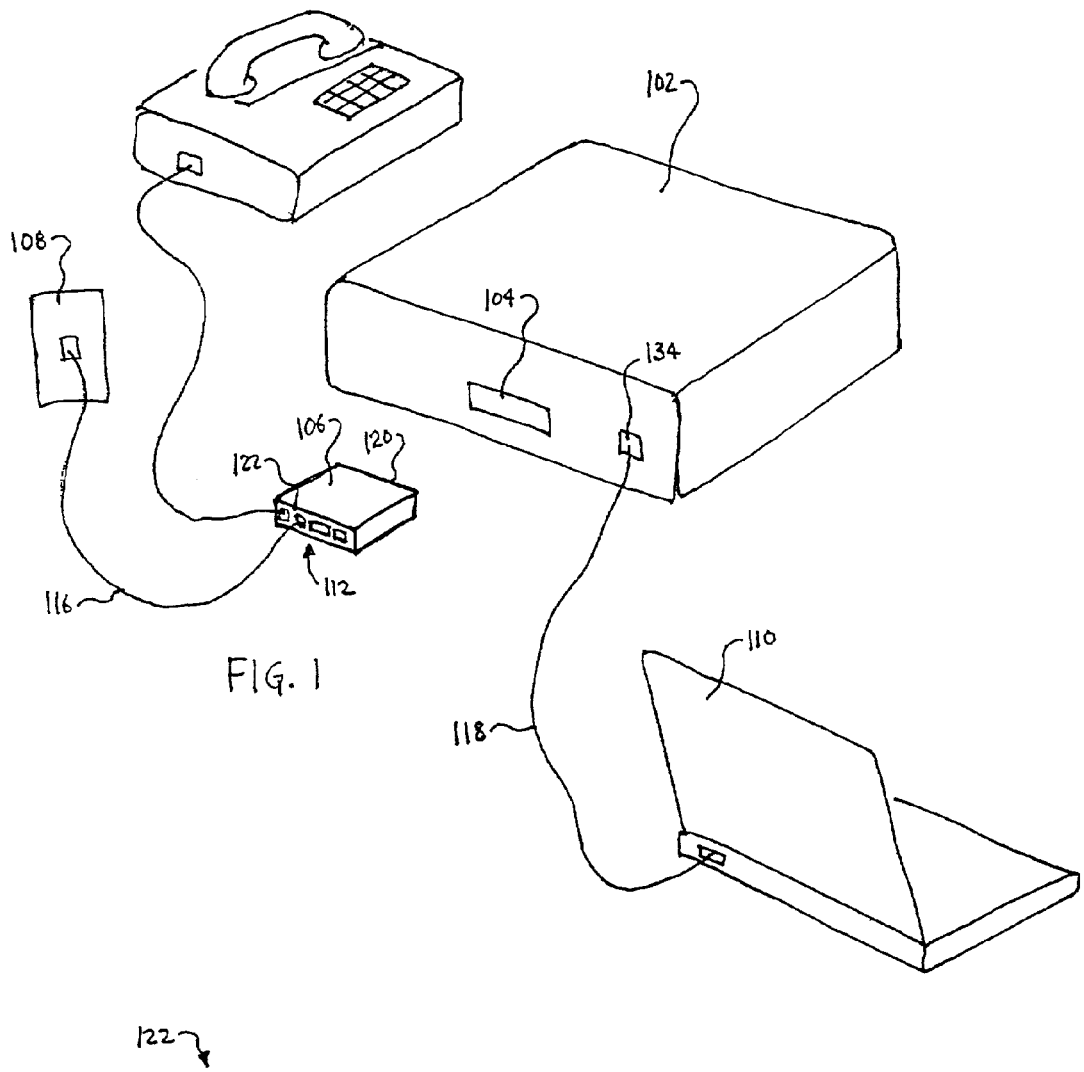
FIG. 1 is an exploded isometric view of a preferred embodiment of a modem in accordance with the present invention.

FIG. 1 shows a preferred embodiment of a modem 102 in accordance with the present invention. Modem 102 includes a location 104 that is designed to receive a filter cartridge 106. Location 104 can be placed in any desired part of modem 102. Preferably, location 104 is placed at the rear of modem 102 as shown in FIG. 1. In another embodiment, shown in FIG. 6, location 604 is placed on a side of modem 602. Modem 102 can be connected to a wall jack 108 and a computer 110 or any device that uses DSL services.

Figure 2:
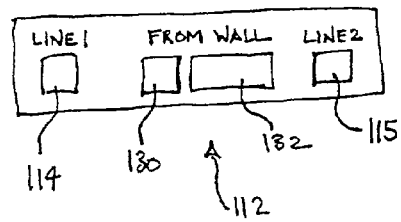
FIG. 2 is an enlarged view of an end of a preferred embodiment of a filter cartridge in accordance with the present invention.

Referring to FIGS. 1 and 2, filter cartridge 106 includes a first end 120 that is designed to enter location 104 of modem 102. Filter cartridge 106 also includes a second end 122 that faces in a different direction than first end 120, and second end 122 is preferably exposed when filter cartridge 106 is installed in modem 102. Preferably, the substantial remainder of filter cartridge 106 is received in location 104 and is not visible after being installed.

Second end 122 preferably includes several connectors, at least one input connector 112 and a first telephone connector 114. In some embodiments, second end 122 also includes a second telephone connector 115. This second telephone connector 115 is optional. Input connector 112 is adapted to receive a line 116 that places filter cartridge 106 in communication with wall jack 108. In order to accommodate a variety of different installation situations, filter cartridge 106 can include more than one type of input connector 112. In the embodiment shown in FIG. 2, an RJ-11 connector 130 and an RJ-45 connector 132 are provided. Providing several different types of connectors can assist in easily placing filter cartridge 106 in communication with wall jack 108 regardless of the configuration of wall jack 108.

Modem 102 also preferably includes a DSL connector 134 that is configured to receive a DSL line 118 that places modem 102 in communication with a device adapted to receive DSL communications. A computer 110 is an example of a device that is adapted to receive DSL communications. Computer 110 would likely include a DSL modem or other device that would permit computer 110 to use or accept DSL communications.

Figure 3:
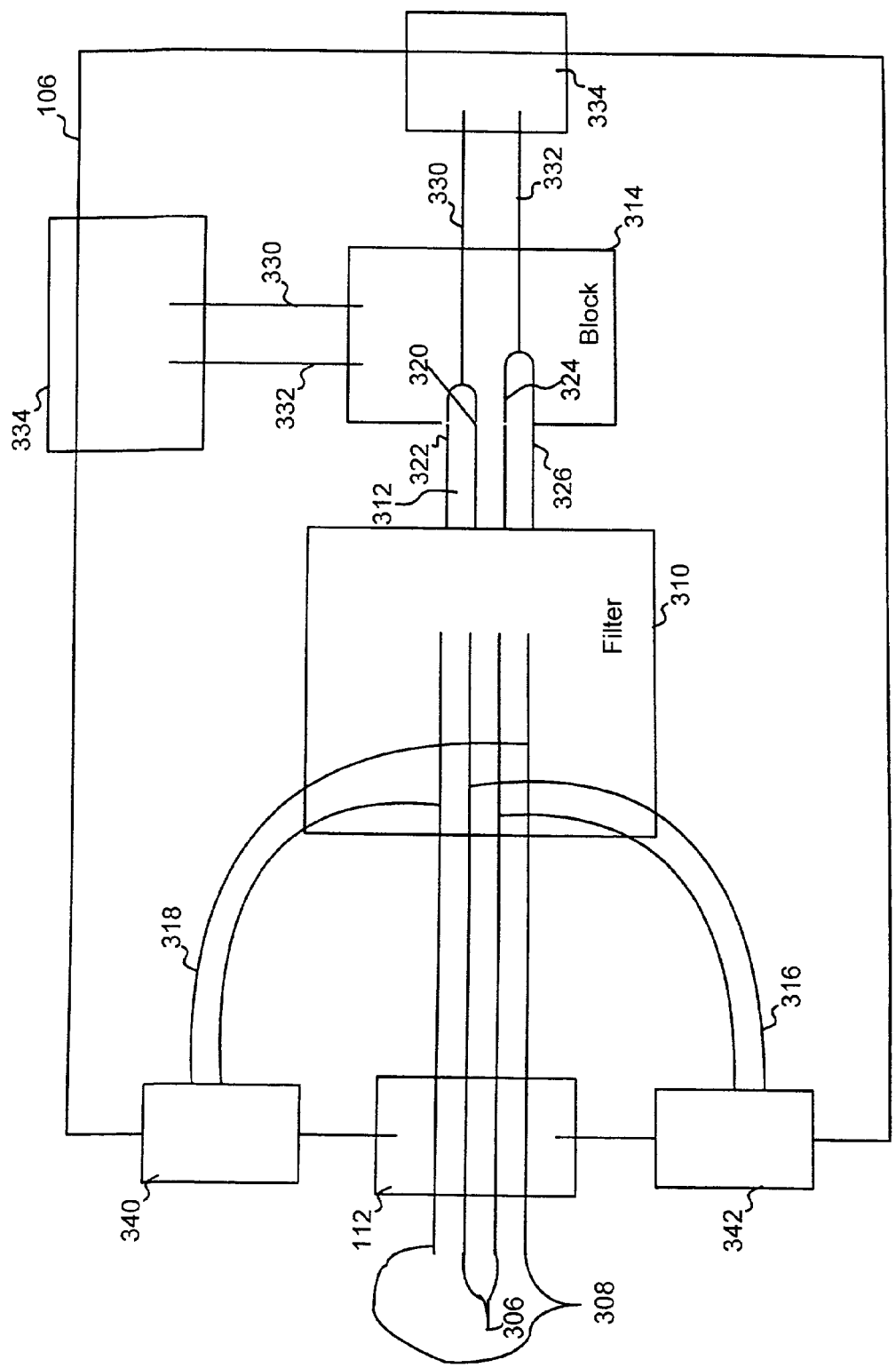
FIG. 3 is a schematic diagram of a preferred embodiment of a filter cartridge in accordance with the present invention.

FIG. 3 shows a schematic diagram of a preferred embodiment of a filter cartridge 106. As discussed above, input connector 112 communicates with wall jack 108 (see FIG. 1). Generally, an inner pair 306 and an outer pair 308 of leads are available. While communications services can be provided on either the inner pair of leads 306 or the outer pair of leads 308, communications services are usually provided on the inner pair 306 of leads. Inner 306 and outer 308 leads preferably placed in communication with a filter 310. Intermediate leads 312 are in communication with filter 310 and extend downstream of filter 310. Intermediate leads 312 are in communication with inner 306 and outer 308 leads and preferably carry the same signal as inner lead 306 and outer lead 308.

In some embodiments, intermediate leads 312 are simply continuations of inner 306 and outer 308 leads and those leads are physically the same lead. In other embodiments, intermediate leads 312 are placed in communication with respective inner 306 and outer 308 leads. Regardless of the exact physical arrangement, intermediate leads 312 are intended to by-pass filter 310 so that the signal carried by intermediate leads 312 is unaffected by filter 310. In other words, intermediate leads 312 carry the unfiltered signals traveling through inner 306 and outer 308 leads.

Intermediate leads 312 eventually reach a block 314 or junction. Block 314 merges or joins the intermediate leads 312 in a way that a first inner lead 320 is joined with a first outer lead 322 and a second inner lead 324 is joined with a second outer lead 326. The output of the first inner lead 320 and the first outer lead 322 is sent to a first combined conductor 330 and the output of the second inner lead 324 and the second outer lead 326 is sent to a second combined conductor 332. In this way, regardless of which set of leads is used, whether it be the inner or outer set of leads, first and second combined conductors 330 and 332 will be able to deliver whatever signal is received from input connector 112. In some embodiments, filter 310 can be combined with block 314 into a unitary member so that the unitary member performs both the functions of the filter 310 and the block 314.

First and second combined conductors 330 and 332 are preferably placed in communication with an electrical connector 334 that is designed to engage a corresponding electrical connector (not shown) disposed within location 104. In other embodiments, the electrical connectors of the filter cartridge 106 could be located on any face or surface of the filter cartridge and provisions would be made in modem 102 to suitably engage those electrical connectors. For example, an electrical connector 336 could be disposed on a side of filter cartridge 106. Electrical connector 336 could be used as an alternative to electrical conductor 334 or could be used in addition to electrical conductor 334. Electrical connector 334 and/or 336 allow modem 102 (see FIG. 1) to communicate with filter cartridge 106 and therefore, with wall jack 108.

Filter 310 is preferably a standard DSL filter and can remove unwanted noise and signals. As shown in FIG. 3, a first pair of telephone conductors 318 can be placed in communication with the outer pair of leads 308. Likewise, a second pair of telephone conductors 316 can be placed in communication with the inner pair of leads 306. Preferably, the signal received by the first and second pairs of telephone conductors 318 and 316, respectively, has been filtered affected by filter 310 in order to remove unwanted noise and extraneous signals. The first pair of telephone conductors 318 can be placed in communication with a first telephone jack 340 and the second pair of telephone conductors 316 can be placed in communication with a second telephone jack 342. In some embodiments, the first and second telephone conductors 318 and 316 are combined into a single telephone jack. The first telephone jack 340 and the second telephone jack 342 are capable of receiving a telephone connector and placing any telephone or device in communication with input connector 112.

After filter cartridge 106 has been installed in modem 102, second end 122, all of the various connectors shown in FIG. 2 are visible and readily accessible. This arrangement provides a convenient system for providing telephone access. Users can plug telephones directly into modem 102 and do not have to search for inconvenient telephone connectors located in walls, behind furniture, and other hard to reach locations.

Preferably, filter cartridge 106 is designed in a way that makes it easy to remove the filter cartridge 106 from modem 102. Many different options and possibilities could be utilized.

Figure 4:
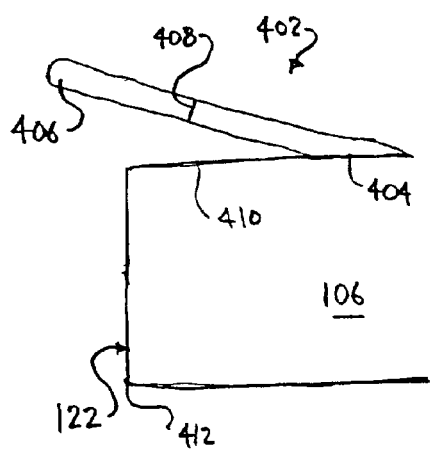
FIG. 4 is a schematic diagram of a side view of preferred embodiment of a latch in accordance with the present invention.
Figure 5:
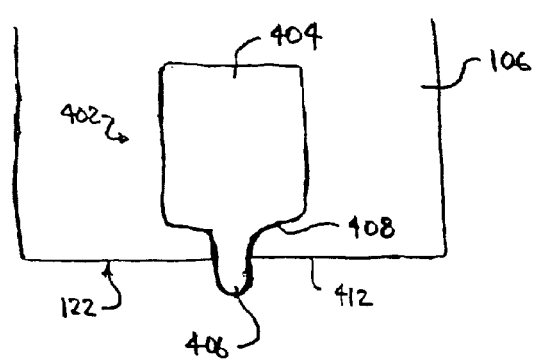
FIG. 5 is a schematic diagram of a top view of preferred embodiment of a latch in accordance with the present invention.

FIGS. 4 and 5 show a preferred embodiment of one possible arrangement that can be used to provide easy installation and removal of filter cartridge 106. Filter cartridge 106 includes a latch 402 that includes a first end 406 and a second end 404. Preferably, second end 404 of latch 402 is associated with an upper surface 410 of filter cartridge 106. In an exemplary embodiment, the second end 404 is fixedly attached to upper surface 410. The first end 406 is disposed opposite second end 404 and preferably extends axially beyond leading edge 412 of the second end 122 of filter cartridge 106.

Preferably, latch 402 is biased in a direction away from upper surface 410 and latch 402 includes at least one shoulder 408. Preferably, the bias is achieved by elastic deformation of latch 402. Preferably, a matching shoulder and void (not shown) is provided in location 104 (see FIG. 1) where the void accommodates first end 406 and where the matching shoulder opposes shoulder 408. When filter cartridge 106 is inserted into location 104 (see FIG. 1), latch 402 is initially pressed towards upper surface 410 until latch 402 returns to its biased, raised position when first end 406 enters the void. In this position, shoulder 408 engages a mating shoulder disposed in location 104 and securely retains filter cartridge 106 in position.

To remove filter cartridge 106, a user presses first end of latch 406 towards upper surface 410 until shoulder 408 clears the mating shoulder disposed in location 104. Preferably, first end 406 extends beyond the leading edge 412 of second end 122 to facilitate operation of latch 402. When this occurs, filter cartridge 106 is free and can be easily removed from location 104.

Figure 6:
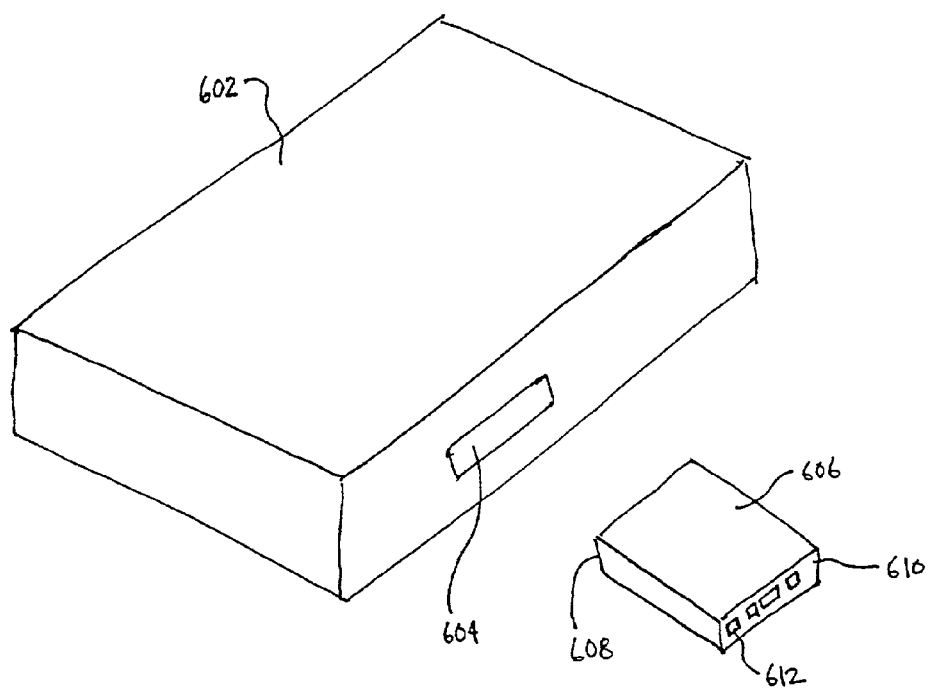
FIG. 6 is an exploded isometric view of another embodiment of a telephone in accordance with the present invention.
Figure 7:
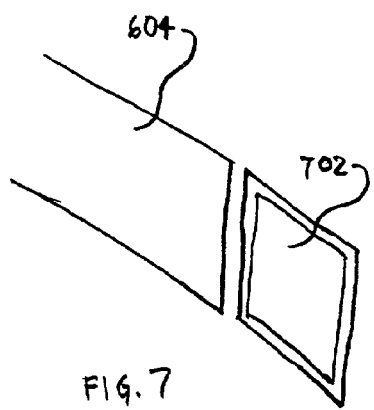
FIG. 7 is an enlarged isometric view of a portion of a preferred embodiment of a telephone in accordance with the present invention.

FIG. 6 shows another embodiment of a modem 602. Modem 602 includes a location 604 that is designed to receive a filter cartridge 606. In this embodiment, location 604 is placed on a side of modem 602 that is different than the side shown in FIG. 1. Location 604 is also placed on a side different than DSL connector 134. Filter cartridge 606 includes a standard DSL filter. In a preferred embodiment, a first end 608 of filter cartridge 606 includes an electrical connector that is designed to engage a corresponding electrical connector (not shown) disposed within location 604. In other embodiments, the electrical connectors of the filter cartridge 606 could be located on any face or surface of the filter cartridge and provisions would be made in modem 602 to suitably engage those electrical connectors.

Filter cartridge 606 also has a second end 610. Second end 610 is designed to be accessible after filter cartridge 606 has been installed in modem 602. Second end 610 includes at least one electrical connector. Preferably, second end 610 includes a telephone connector, and in an exemplary embodiment, second end 610 includes a female telephone connector 612.

After filter cartridge 606 has been installed in modem 602, second end 610, which includes a telephone connector, is visible and readily accessible. This arrangement provides a convenient system for providing both DSL access and telephone access. Users can plug DSL devices directly into modem 602, connect telephones directly into telephone connector 612 and do not have to search for inconvenient DSL connectors or telephone connectors located in walls, behind furniture, and other hard to reach locations.

Figures 8, 9, 10:
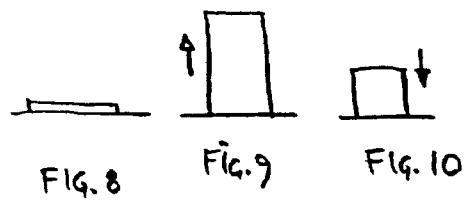
FIG. 8 is a schematic diagram of a preferred embodiment of a button in a rest position in accordance with the present invention.
FIG. 9 is a schematic diagram of a preferred embodiment of a button in a deployed position in accordance with the present invention.
FIG. 10 is a schematic diagram of a preferred embodiment of a button in a pressed position in accordance with the present invention.

Preferably, filter cartridge 606 is designed in a way that makes it easy to remove the filter cartridge 606 from modem 602. Preferably, an ejection system similar to one used for a PCMCIA slot is utilized. Referring to FIGS. 7–10, the ejection system includes a three position button 702. Button 702 has a rest position (see FIG. 8). From the rest position, when button 702 is pressed, button 702 extends outwards to a deploy position, as shown in FIG. 9. When button 702 is pressed from the deploy position, as shown in FIG. 10, filter cartridge 606 is ejected from modem 602.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A modem comprising:
    a housing including modem circuitry, including a location that is a slot exposing an internal portion of the housing and that is adapted to receive a filter cartridge into the internal portion of the housing, the modem circuitry including an internal electrical connector exposed within the internal portion that includes at least one modem conductor pair;
    a filter cartridge removably inserted into the location and including a first end and second end, the filter cartridge including filter circuitry for filtering the analog signals from DSL signals received on either of at least two input conductor pairs, outputting DSL signals on at least one of two filtered conductor pairs while outputting analog signals on at least one of two analog conductor pairs, and including a block to merge the two filtered conductor pairs into a single filtered conductor pair that is in electrical engagement with the at least one modem conductor pair;
    the first end including at least one electrical connector that includes the single filtered conductor pair and that is in electrical and physical engagement with the internal electrical connector disposed in the location of the housing;
    the second end including at least two telephone connectors of a first gender with each of the at least two telephone connectors of the second end adapted to receive a telephone connector of the opposite gender, the second end remaining exposed to an area external to the housing while the filter cartridge is removably inserted into the location, a first of the at least two telephone connectors of the second end receiving both analog and DSL signals on at least one of the at least two input conductor pairs, the filter cartridge sending the analog signals to the second of the at least two telephone connectors on at least one of the two analog conductor pairs of the second end.

2. The modem according to claim 1, wherein a three position switch is used to eject the filter cartridge from the housing.

3. The modem according to claim 1, wherein the first gender is female.

4. A filter cartridge adapted for use with a modem comprising:
    means for filtering analog signals from DSL signals received on either of at least two input conductor pairs, for outputting DSL signals on at least one of two filtered conductor pairs while outputting analog signals on at least one of two analog conductor pairs, and for merging the two filtered conductor pairs into a single filtered conductor pair that is in electrical engagement with the at least one modem conductor pair;
    a first end and second end;
    the first end including at least one electrical connector for engaging a corresponding electrical connector, the electrical connector including the single filtered conductor pair and being capable of providing the DSL signals; and
    the second end including first telephone connector of a first gender adapted to receive a telephone connector of the opposite gender, the first telephone connector of the first gender including the two input conductor pairs, the second end further including a second telephone connector of the first gender that includes the two analog conductor pairs.

5. The filter cartridge according to claim 4, wherein the second end of the filter cartridge includes a female telephone connector.

6. The filter cartridge according to claim 4, further comprising a latch.

7. The filter cartridge according to claim 6, wherein the latch is biased away from the filter cartridge.

8. The filter cartridge according to claim 6, wherein the latch includes a shoulder.

9. The filter cartridge according to claim 6, wherein the latch includes an end disposed axially beyond a leading edge of the filter cartridge.

10. A filter cartridge adapted for use with a modem comprising:
- means for filtering analog signals from DSL signals received on either of at least two input conductor pairs, for outputting DSL signals on at least one of two filtered conductor pairs while outputting analog signals on at least one of two analog conductor pairs, and for merging the two filtered conductor pairs into a single filtered conductor pair that is in electrical engagement with the at least one modem conductor pair;
- a first side and a second side;
- the first side including at least one electrical connector for engaging a corresponding electrical connector, the electrical connector including the single filtered conductor pair and being capable of providing the DSL signals;
- the second side including at least one input connector capable of receiving both a DSL signal and a telephone signal via either of the at least two input conductor pairs, and a telephone connector capable of outputting the analog signal via at least one of the two analog conductor pairs, the input connector in communication with the means for filtering, the input connector also in communication with telephone leads that are in communication with the telephone connector;
- an unfiltered signal being sent to intermediate leads that are in communication with the means for filtering and a block as the means for merging; and
- wherein the block is in communication with the electrical connector.

11. The filter cartridge according to claim 10, wherein the at least one electrical connector is disposed on a side opposite the second side.

12. The filter cartridge according to claim 10, wherein the at least one electrical connector is disposed on a side adjacent to the second side.

13. The filter cartridge according to claim 10, further comprising a second telephone connector in communication with the means for filtering.

* * * * *